US012326907B2

(12) United States Patent
Lundberg (10) Patent No.: US 12,326,907 B2
(45) Date of Patent: Jun. 10, 2025

(54) DOCUMENT SPLITTING TOOL (71) Applicant: Black Hills IP Holdings, LLC, Minneapolis, MN (US)

(72) Inventor: Steven W. Lundberg, Edina, MN (US)

(73) Assignee: Black Hills IP Holdings, LLC, Minneapolis, MN (US)

( * ) Notice: Subject to any disclaimer, the term of this patent is extended or adjusted under 35 U.S.C. 154(b) by 30 days.

(21) Appl. No.: 17/723,121

(22) Filed: Apr. 18, 2022

(65) Prior Publication Data

US 2023/0047250 A1 Feb. 16, 2023

Related U.S. Application Data

(60) Provisional application No. 63/232,819, filed on Aug. 13, 2021.

(51) Int. Cl.
*G06F 16/93* (2019.01)
*G06F 40/169* (2020.01)
*G06F 40/186* (2020.01)
*G06F 40/289* (2020.01)
*G06N 20/00* (2019.01)
*G06Q 10/0639* (2023.01)

(52) U.S. Cl.
CPC .......... *G06F 16/93* (2019.01); *G06F 40/169* (2020.01); *G06F 40/186* (2020.01); *G06F 40/289* (2020.01); *G06N 20/00* (2019.01); *G06Q 10/06395* (2013.01); *G06F 2216/11* (2013.01)

(58) Field of Classification Search
CPC ...... G06F 16/93; G06F 40/169; G06F 40/186; G06F 40/289; G06F 2216/11; G06F 40/279; G06N 20/00; G06Q 10/06395
See application file for complete search history.

(56) References Cited

U.S. PATENT DOCUMENTS

| | | | | |
|---|---|---|---|---|
| 5,325,297 A * | 6/1994 | Bird | ...................... | G06F 16/40 715/201 |
| 9,569,437 B2 * | 2/2017 | Lee | .......... | G06F 16/93 |
| 9,710,467 B2 * | 7/2017 | Lee | .......... | G06Q 10/10 |
| 11,714,819 B2 * | 8/2023 | Lundberg | ............... | G06Q 10/10 707/E17.014 |
| 2005/0134935 A1* | 6/2005 | Schmidtler | ............. | G06F 40/10 358/448 |
| 2007/0073748 A1* | 3/2007 | Barney | ................... | G06F 16/95 707/E17.093 |
| 2014/0379388 A1* | 12/2014 | Lundberg | ............ | G06F 16/2358 705/310 |
| 2015/0012805 A1* | 1/2015 | Bleiweiss | ............. | G06F 40/134 715/205 |
| 2019/0332963 A1* | 10/2019 | Wong | ..................... | G06N 20/00 |
| 2020/0126663 A1* | 4/2020 | Lucas | ............. | G06V 30/19013 |
| 2020/0366959 A1* | 11/2020 | Pau | ........................ | G06N 20/00 |

* cited by examiner

*Primary Examiner* — Angelica Ruiz
(74) *Attorney, Agent, or Firm* — Schwegman Lundberg & Woessner, P.A.

(57) ABSTRACT

Various embodiments disclosed relate to automated docketing of incoming electronic communications and documents. The present disclosure includes methods and systems for identifying omnibus documents containing more than one event, and splitting those omnibus documents into the individual events or documents.

20 Claims, 5 Drawing Sheets

DOCUMENT SPLITTING TOOL

CLAIM OF PRIORITY

This application claims the benefit of priority under 35 U.S.C. § 119(e) to U.S. Provisional Patent Application Ser. No. 63/232,819, filed on Aug. 13, 2021, which is incorporated by reference herein in its entirety.

BACKGROUND

For a given project, a variety of deadlines and tasks may be required. Often, a large number of incoming communications and documents have to be sorted and analyzed for those tasks. When the project is collaborative, such as with an outside firm or company, communication between the outside firm and the internal project management can be required to properly docket deadlines, tasks, or other actions that should be met throughout the course of the project. Often, this aspect of project management is done through free form communication and human interpretation of instructions from the outside firm.

In a business, docketing systems can be used to track workflow deadlines, tasks, and progress. For example, in a given project, a docketing system can track when the project is opened, what initial filings are due when, and correspondence coming in regarding that project. The docketing system can additionally be used to record deadlines and flag correspondence or documents that may require a response. However, in a general docketing setting, a large number of documents are incoming and often need to be sorted during docketing. Those documents can come in a variety of file formats, and can sometimes be grouped together, requiring more work once received to efficiently split and docket each document.

SUMMARY OF THE DISCLOSURE

Disclosed is a method of sorting and separating incoming electronic communications and documents for project management and docketing. The method takes incoming documents, such as in portable document format (PDF) form, and can assist in separating of multi-document packages into individual events or items.

Incoming documents can sometime be received in packets or packages containing more than one individual document. For example, an incoming electronic communication can include an attached PDF file with multiple documents, each document indicating a different event in the project or file history.

In this case, where multiple distinct documents are contained in one electronic file, it is helpful to separate the individual documents out. After the documents are separated out into separate electronic files, those documents can be more efficiently and easily docketed. Deadlines and tasks can be prepared and assigned based on the individual documents. The methods and systems discussed herein can allow for more efficient and effective docketing of incoming individual documents.

For example, a method can include receiving an electronic communication with a document, the document containing multiple items to be docketed; identifying each of the multiple items to be docketed; separating each of the multiple items to be docketed to multiple individual items to be docketed; and sending each of the individual items to a docketing system for docketing.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present disclosure describes, among other things, a document splitting tool for incoming omnibus files. For example, when a PDF file is received, it many contain multiple different items or documents. The document spitting tool can be used to analyze the PDF, tag different items or documents, and initiate splitting of those items into separate files for easy access and use. In some cases, the splitting tool can additionally sort, label, or otherwise direct the split items and documents.

As used herein, "electronic communication" refers to an electronic message or a method of exchanging messages between people using electronic devices.

As used herein, "application" or "program" can include a program or piece of software designed and written to fulfill a particular purpose of the user, such as a database application.

As used herein, "associate" can include a partner or colleague in business or at work, either internal or external.

As used herein, "unstructured text" or "unstructured data" refers to data that is not organized in a standard format, for example, text in the body of an electronic communication.

As used herein, "structured text" or "structured data" refers to data that is organized in a standard format such that a recipient may read the data and institute an automated computing system action without human interpretation of the data.

As used herein, "scraping," "web scraping," "data scraping," or "web crawling," can refer to automatically mining or collecting data or information, such as from a database or from the internet.

As used herein, "file" or "matter" can refer to a particular project, enterprise, or undertaking being worked on by an individual or a collaborative group, planned and designed to achieve a particular aim.

As used herein, "official record," or "file history," can refer to data about a file or matter denoting evidence about past events or tasks within that file or matter, such as an electronic record of previous events in the file or matter. An "official record" can be stored with and maintained by an overseeing agency or organization, such as a governmental organization.

As used herein, "database," can refer to a structured set of data, such as held in a computer or on the internet, that can be accessible in various ways.

As used herein, "splitting," can refer to separating various files into individual documents or files.

As used herein, "omnibus document" can refer to a single electronic file containing more than one item. For example, an omnibus document may be an electronic file containing two or more documents.

Figure 1:
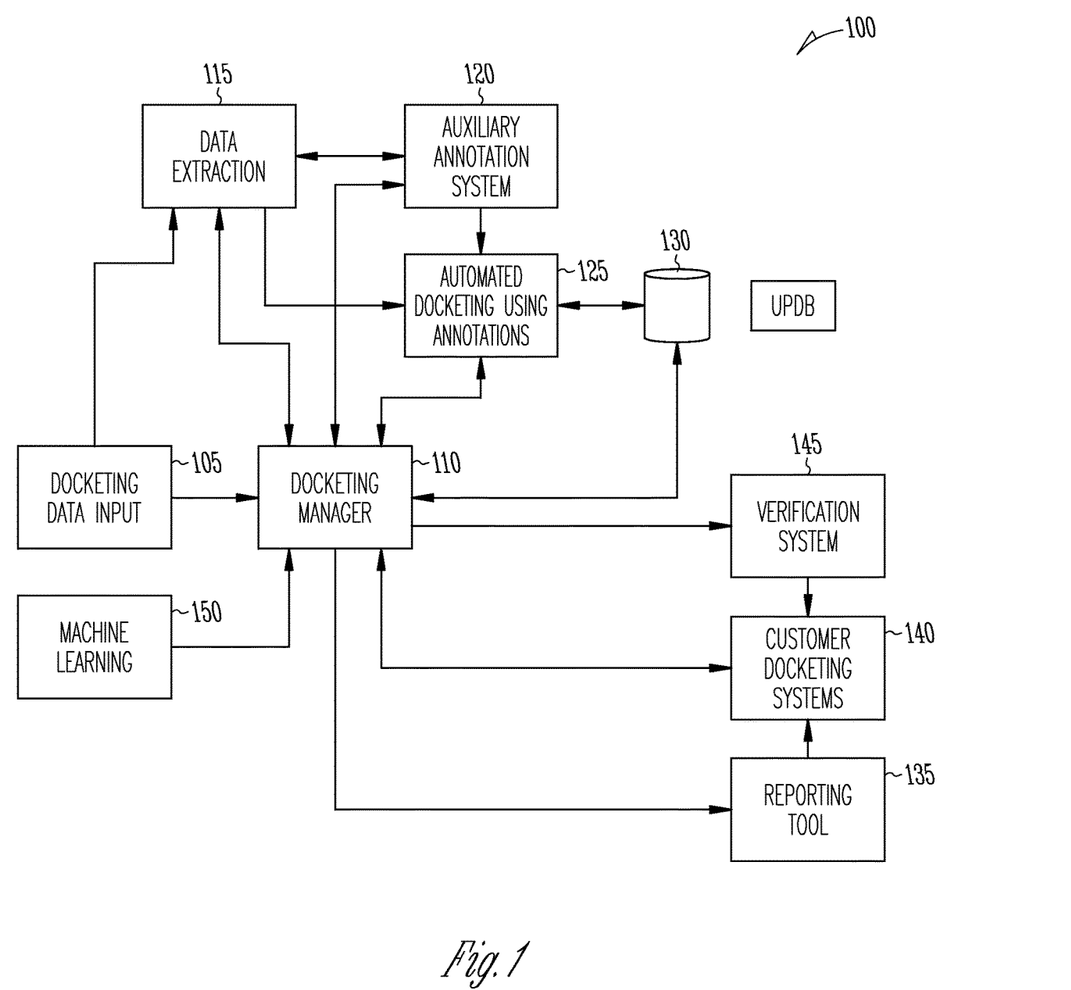
FIG. 1 is a schematic diagram of a docketing system in an example.

FIG. 1 is a block diagram of a docketing system 100 in an example. The docketing system 100 can be automated or semi-automated. The docketing system 100 can include docketing data input 105, docketing manger 110, data extraction 115, auxiliary annotation system 120, automated docketing using annotations 125, Universal Procedures Database 130, reporting tool 135, customer docketing system 140, verification system 145, and machine learning 150.

The automated docketing system 100 can receive documents from third party sources including third party docketing systems and/or customer data as docketing data input 105. The docketing manger system 110 can process the received documents to provide to the customer docketing systems 140 and prepare the documents for data extraction by the data extraction system 115 as needed.

The data extraction system 115 can perform Optical Character Recognition (OCR) on the received documents from the docketing manger system 110 to extract data, read checkboxes, extract lists, and identify documents where possible. The docketing manger system 110 can also integrate with a Universal Procedures Database (UPDB) 130 to provide automated docketing by an automated docketing tool 125 that processes received documents based on the additional annotations added to the documents based on the complex data extraction performed by the Auxiliary Annotation System (AAS) 120.

The AAS 120 may further identify the received documents without using an OCR. To manage this process, the docketing manger system 110 can receive frequent updates of docketing procedure rules including configuration data and updates the UPDB 130 with universal procedure codes (UPCs) as appropriate. The UPCs can be used in conjunction with customer specific codes, checklists, and templates. The rules can specify how to fill in the templates and how to complete customer-specific procedures such as how to docket documents into the customer's docketing system 140, for example. The template can be filled out by pulling in attributes from the annotations in a document.

The docketing manger system 110 can receive or intake documents and docketing data from several different sources of docketing data input 105, validate the docketing items against entries in a customer's docketing system 140, and communicate those documents to the customer's docketing system 140 via a unified interface. The docketing manger system 110 can also route documents and associated docketing data through the data extraction system 115 and the AAS 120 and organizes the returned metadata and annotations. The docketing manger system 110 thus can provide a breakout between the metadata and the document text.

The docketing manger system 110 can also keep records and communicate with third-party application programming interfaces (APIs) to push the docketing data and documents automatically where allowed. Otherwise, the docketing manger system 110 can present the documents to human docketers to docket. The docketing manger system 110 may also issue reports upon request.

The Docketing manger system 110 can be integrated with a customer's existing docketing system (e.g., Foundation IP), semi-integrated (e.g., CPI, Anaqua, etc.), may provide a virtual host that does not talk at all to the customer's existing docketing system (e.g., Lecopio, IP Manager, Memotech), or may provide outputs in spreadsheet form for use by a docketing administrator to update the customer's docking system 140.

If the Docketing manger system 110 and the customer's docketing system are not integrated, the data output of automated docketing system 100 may be presented to a human docketer for manual entry. For example, the human docketer may implement macros that interface with the customer's docketing system 140 to populate the received data into the customer's docketing system 140.

On the other hand, if the docketing manger system 110 and the customer's docketing system 140 are integrated or semi-integrated, the data output may be processed to determine if any data is missing to automate the docketing process. If anything is missing, the human docketer can add that information before the automated docketing process may proceed further or the data may be auto-populated and mapped to the template from the UPDB 130.

The automated docketing system 100 can also perform several post-docketing actions, such as sending docketing reports/details to an external verification system 145 that use a set of rules to verify proper docketing in a host system. The verification system 145 can verify that the data is correctly added to the external customer's docketing system 140. For example, the verification system 145 can pull data from the AAS 120, the docketing manger system 110, and the customer's docketing system 140 to compare what is present to what is expected to be present in the respective systems.

The automated docketing system 100 may also provide automated email "report out" notifications to customers by implementing a reporting tool 135 that specifies docketing actions based on UPDB template configurations. The reporting tool 135 can also provide completed docketing reports to customers either directly or via the customers' docketing system 140.

In some cases, machine learning techniques may be used to generate annotations. For example, a database of past documents that have been identified may be provided by the docketing manger system 110 and used as a data warehouse to train and improve machine learning models by creating a training set for the machine learning model. Over time, the machine learning model system 150 can learn which PTO IDs to use for which documents, which document in a bundle of documents may be used to characterize the bundle, and may provide predicted PTO IDs for the received documents. The machine learning model system 150 can also establish rule engine prediction capabilities for received documents that test the classifications.

Figure 2:
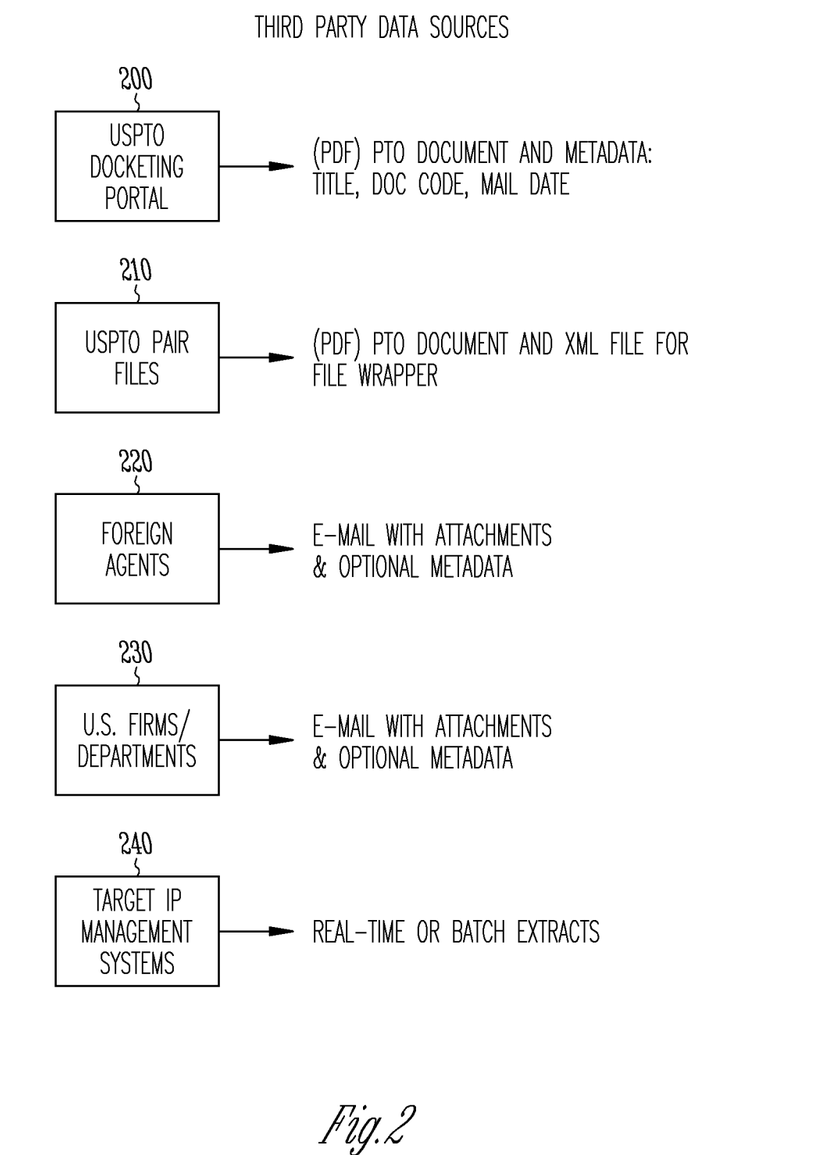
FIG. 2 illustrates sample third party data sources that provide docketing data input for an automated docketing system implemented for managing patent portfolios in a sample embodiment.

FIG. 2 illustrates sample third party data sources that provide docketing data input 105 for an automated docketing system 100 implemented for managing patent portfolios in an example. As illustrated in FIG. 2, the third party data sources may include the Patent Office (e.g., USPTO) docketing portal 200, which provides documents from the USPTO in portable document format (PDF) and includes metadata identifying the title, document code, and mail date for the corresponding document. The third party data sources may further include USPTO PAIR extensible markup language (XML) files 210, which provide documents from the USPTO in PDF and includes an XML file for patent file wrappers. The third party data sources may also include foreign agents 220 who provide emails with attachments and optional metadata. Foreign agents 220 may also provide hard copy documents that may be scanned for data entry. Similarly, law firms and/or corporate law departments 230 may provide emails with attachments and optional metadata as well as hard copy documents that may be scanned for data entry. Also, third party docketing systems 240 may provide real-time or batch extracts of data for entry into a docketing management system.

Figure 3:
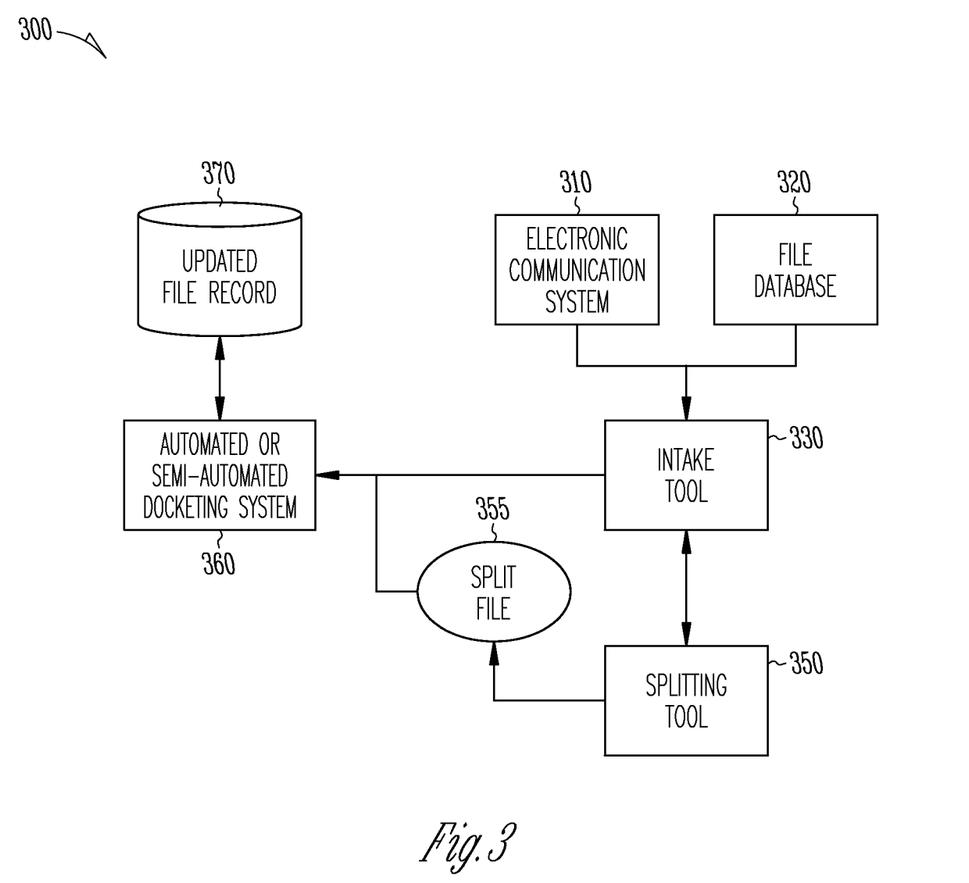
FIG. 3 is a schematic diagram of a system including a splitting tool in an example.

FIG. 3 is a schematic diagram of a file management system 300 with a splitting tool 350 in an example. The system 300 can include an electronic communication system 310, a file database 320, an intake tool 330, a splitting tool 350, a docketing system 360, and a file record 370.

The electronic communication system 310 can be, for example, an e-mail, text, audio, or other means of communicating with internal and external personnel and entities. The electronic communication system 310 can be a user-accessible system for receiving and/or sending messages, such as through a user interface or other computer. The electronic communication system 310 can be, for example, an e-mail server or other communication system.

The file database 320 can include a repository of files or projects being working on by the company. The file database 320 can be, for example, a public or private database, such as a governmental run database. In an example, the USPTO PAIR database can be accessed. In an example, ESPACENET can be accessed. In some cases, other database can be used. In some cases, privately run and updated databases can be accessed. The file database 320 can include information on various files of interest for the business. For example, the file database 320 can include information about patent applications or trademark applications. Such information can, for example, include communications from a governmental agency, responses filed by the company, and other official documents.

The intake tool 330 can include a program or application for receiving electronic communications and associated documents or files. In some cases, the intake tool 330 can be configured to analyze incoming documents to determine if an omnibus file needing splitting is present. In some cases, the intake tool 330 can flag an omnibus file for splitting for presentation to a user. In some cases, the intake tool 330 can automatically send the omnibus document to the spitting tool 350. In some cases, the intake tool 330 can be a user interface for interaction with a user. In this case, the user can identify and select omnibus files to send to the splitting tool 350.

The splitting tool 350 can be an application or program for separating multiple items included in an omnibus file. The splitting tool 350 can receive one or more omnibus files from the intake tool 330 and/or a user.

The splitting tool 350 can be trained, for example by machine learning, to recognize one or more phrases, characters, or codes, to aid in identifying where or how the omnibus document should be split into multiple documents. The splitting tool 350 can analyze the received omnibus file, such as by an auxiliary annotation system (AAS), optical character recognition (OCR), or other character or image recognition techniques, such as discussed above with reference to the docketing system in FIG. 1. After analyzing and identifying one or more locations where the omnibus document should be split, the splitting tool can separate the omnibus document into several files at the identified locations.

The docketing system 360 can be an automated or semi-automated docketing system, such as the docketing system discussed above with reference to FIG. 1. The docketing system 360 can be in communication with the intake tool 330 and the splitting tool 350, and can receive documents, tasks, and communications with the intake tool 330. The docketing system 360 can communicate with and update the file records 370.

The file records 370 can, for example, be a local or cloud based file storage system including information of files and projects being worked on at or monitored by the company. The file records 370 can contain historical records, such as past events, communications, and decisions in each file.

Figure 4:
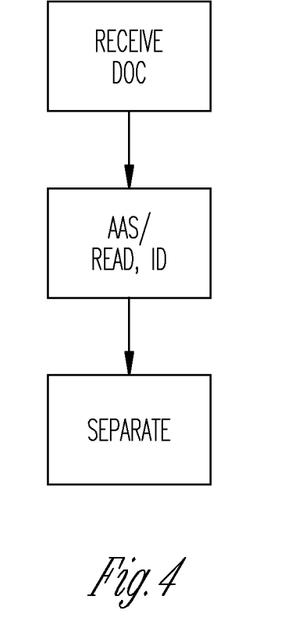
FIG. 4 is a flow chart depicting a method of splitting incoming docketing items in an example.

FIG. 4 is a flow chart depicting a method 400 of splitting incoming docketing items in an example. The method 400 can include blocks 410 to 440.

At block 410, an electronic communication is received with an omnibus document. The electronic communication can be, for example, an e-mail, a text, or other type of communication including a document, such as an attachment, an embedded file, or a link to a cloud document.

At block 420, an omnibus document is identified, and multiple items within the omnibus documents are identified. An omnibus document can be a document containing two or more discrete items, such a events or files. An intake tool application can be used to identify omnibus documents, such as by OCR. The intake tool can be trained, such as by machine learning, to identify codes, phrase, or characters indicating more than one item in the omnibus document. The intake tool can use a system, such as an AAS, to apply one or more annotations to the omnibus document, indicating the document requires splitting. The omnibus document can then either manually or automatically be sent for splitting.

An application or program, such as a splitting tool, can then receive the identified omnibus document, and analyze it. For example, the splitting tool can conduct OCR to identify one or more codes, phrases, document types, or events, within the omnibus document. The splitting tool can flag individual files within the document based on this analysis, such as by adding annotations to the omnibus file through an AAS system.

At block 430, each of the multiple items is separated. This can be done, for example, by automated or semi-automated action at the spitting tool. For example, the omnibus file can contain one or more annotations (e.g., structured text identifiable by the system) indicating a split should be made at a particular point within the file. The splitting tool can accordingly slice up the document into multiple different documents, each representing one item or event. The splitting tool can confirm successful splitting by additional review, either automated or manual.

At block 440, each of the multiple items is sent to be docketed. Once splitting is complete, the splitting tool can send the individual items out to a docketing system such as that shown in FIG. 1.

Figure 5:
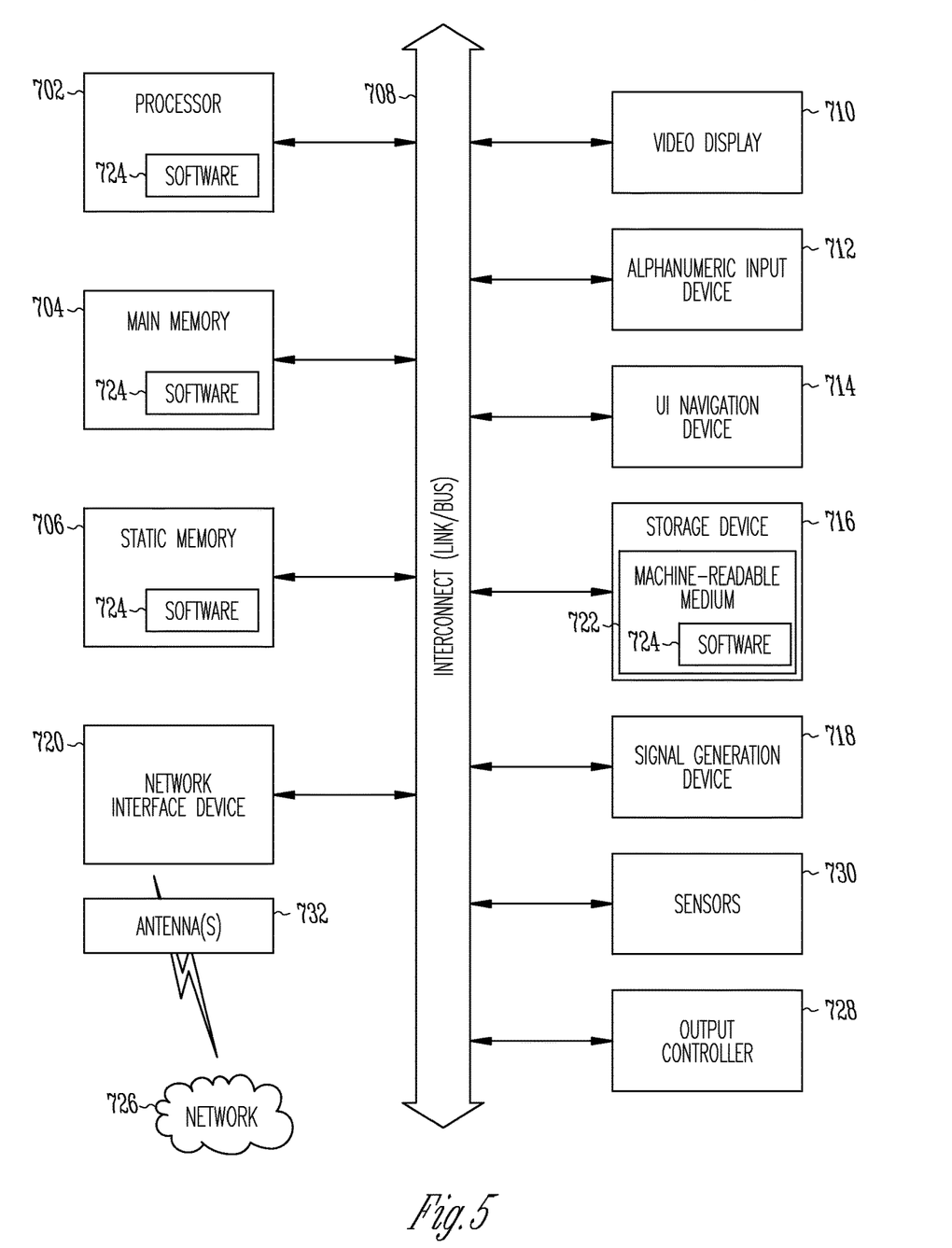
FIG. 5 illustrates a block diagram of an example computing machine upon which any one or more of the techniques or methodologies discussed herein may be implemented.

FIG. 5 illustrates a block diagram of an example computing system machine 700 upon which any one or more of the techniques (e.g., methodologies) discussed herein may perform. Machine 700 (e.g., computer system) may include a hardware processor 702 (e.g., a central processing unit (CPU), a graphics processing unit (GPU), a hardware processor core, or any combination thereof), a main memory 704 and a static memory 706, connected via an interconnect 708 (e.g., link or bus), as some or all of these components may constitute hardware for systems 100 or 200 or hardware to operate the services and subsystems and related implementations discussed above.

Specific examples of main memory 704 include Random Access Memory (RAM), and semiconductor memory devices, which may include, in some embodiments, storage locations in semiconductors such as registers. Specific examples of static memory 706 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 700 may further include a display device 710, an input device 712 (e.g., a keyboard), and a user interface (UI) navigation device 714 (e.g., a mouse). In an example, the display device 710, input device 712 and UI navigation device 714 may be a touch screen display. The machine 700 may additionally include a mass storage device 716 (e.g., drive unit), a signal generation device 718 (e.g., a speaker), a network interface device 720, and one or more sensors 730, such as a global positioning system (GPS) sensor, compass, accelerometer, or some other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the hardware processor 702 and/or instructions 724 may comprise processing circuitry and/or transceiver circuitry.

The mass storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the mass storage device 716 constitutes, in at least some embodiments, machine readable media.

The term "machine readable medium" includes, in some embodiments, any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Specific examples of machine readable media include, one or more of non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks. While the machine readable medium 722 is illustrated as a single medium, the term "machine readable medium" includes, in at least some embodiments, a single medium or multiple media (e.g., a centralized or distributed database, and/or associated caches and servers) configured to store the one or more instructions 724. In some examples, machine readable media includes non-transitory machine readable media. In some examples, machine readable media includes machine readable media that is not a transitory propagating signal.

The instructions 724 are further transmitted or received, in at least some embodiments, over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®), IEEE 802.15.4 family of standards, a Long Term Evolution (LTE) 4G or 5G family of standards, a Universal Mobile Telecommunications System (UMTS) family of standards, peer-to-peer (P2P) networks, satellite communication networks, among others.

An apparatus of the machine 700 includes, in at least some embodiments, one or more of a hardware processor 702 (e.g., a central processing unit (CPU), a graphics processing unit (GPU), a hardware processor core, or any combination thereof), a main memory 704 and a static memory 706, sensors 730, network interface device 720, antennas 732, a display device 710, an input device 712, a UI navigation device 714, a mass storage device 716, instructions 724, a signal generation device 718, and an output controller 728. The apparatus is configured, in at least some embodiments, to perform one or more of the methods and/or operations disclosed herein. The apparatus is, in some examples, a component of the machine 700 to perform one or more of the methods and/or operations disclosed herein, and/or to perform a portion of one or more of the methods and/or operations disclosed herein.

In an example embodiment, the network interface device 720 includes one or more physical jacks (e.g., Ethernet, coaxial, or phone jacks) or one or more antennas to connect to the communications network 726. In an example embodiment, the network interface device 720 includes one or more antennas 732 to wirelessly communicate using at least one of single-input multiple-output (SIMO), multiple-input multiple-output (MIMO), or multiple-input single-output (MISO) techniques. In some examples, the network interface device 720 wirelessly communicates using Multiple User MIMO techniques. The term "transmission medium" shall be taken to include any intangible medium that is capable of storing, encoding or carrying instructions for execution by the machine 700, and includes digital or analog communications signals or other intangible medium to facilitate communication of such software.

At least some example embodiments, as described herein, include, or operate on, logic or a number of components, modules, or mechanisms. Such components are tangible entities (e.g., hardware) capable of performing specified operations and are configured or arranged in a certain manner. In an example, circuits are arranged (e.g., internally or with respect to external entities such as other circuits) in a specified manner as a module. In an example, the whole or part of one or more computer systems (e.g., a standalone, client or server computer system) or one or more hardware processors are configured by firmware or software (e.g., instructions, an application portion, or an application) as a component that operates to perform specified operations. In an example, the software resides on a machine readable medium. In an example, the software, when executed by the underlying hardware of the component, causes the hardware to perform the specified operations.

Accordingly, such components are understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which components are temporarily configured, each of the modules need not be instantiated at any one moment in time. For example, where the components comprise a general-purpose hardware processor configured using software, in some embodiments, the general-purpose hardware processor is configured as respective different components at different times. Software accordingly configures a hardware processor, for example, to constitute a particular component at one instance of time and to constitute a different component at a different instance of time.

Some embodiments are implemented fully or partially in software and/or firmware. This software and/or firmware takes the form of instructions contained in or on a non-transitory computer-readable storage medium, in at least some embodiments. Those instructions are then read and executed by one or more hardware processors to enable performance of the operations described herein, in at least some embodiments. The instructions are in any suitable form, such as but not limited to source code, compiled code, interpreted code, executable code, static code, dynamic code, and the like. Such a computer-readable medium includes any tangible non-transitory medium for storing information in a form readable by one or more computers, such as but not limited to read only memory (ROM); random access memory (RAM); magnetic disk storage media; optical storage media; flash memory, etc.

Various embodiments may be implemented fully or partially in software and/or firmware. This software and/or firmware may take the form of instructions contained in or on a non-transitory computer-readable storage medium. Those instructions are then read and executed by one or more processors to enable performance of the operations described herein. The instructions are in any suitable form, such as but not limited to source code, compiled code, interpreted code, executable code, static code, dynamic code, and the like. Such a computer-readable medium includes, in at least some embodiments, any tangible non-transitory medium for storing information in a form readable by one or more computers, such as but not limited to read only memory (ROM); random access memory (RAM); magnetic disk storage media; optical storage media; flash memory, etc.

Various Notes & Examples

Example 1 can include a method comprising: receiving an electronic communication with a document, the document containing multiple items to be docketed; identifying each of the multiple items to be docketed; splitting the document into individual items to be docketed; and sending each of the individual items to a docketing system for docketing.

Example 2 can include Example 1, further comprising determining one or more docket tasks associated with each of the multiple items to be docketed.

Example 3 can include any of Examples 1-2, further comprising determining one or more deadlines associated with each of the multiple items to be docketed.

Example 4 can include any of Examples 1-3, further comprising labeling each of the individual items.

Example 5 can include any of Examples 1-4, further comprising sorting each of the individual items into one or more categories.

Example 6 can include any of Examples 1-5, further comprising applying structured text to each of the individual items, the structured text denoting the one or more categories.

Example 7 can include any of Examples 1-6, further comprising directing each of the individual items to one or more locations.

Example 8 can include any of Examples 1-7, further comprising flagging at least of the individual items for further review.

Example 9 can include any of Examples 1-8, further comprising identifying the document containing multiple items to be docketed prior to identifying each of the multiple items to be docketed.

Example 10 can include any of Examples 1-9, wherein identifying the document containing multiple items comprises optical character recognition.

Example 11 can include any of Examples 1-10, wherein identifying the document containing multiple items comprises using an auxiliary annotation system and applying one or more annotations to the document.

Example 12 can include any of Examples 1-11, wherein identifying each of the multiple items to be docketed comprise analyzing the document containing multiple items with optical character recognition.

Example 13 can include any of Examples 1-12, wherein optical character recognition is used to identify one or more codes, phrases, templates, or other objects indicating different items in the omnibus file.

Example 14 can include any of Examples 1-13, wherein identifying each of the multiple items to be docketed comprise analyzing the document containing multiple items using an auxiliary annotation system.

Example 15 can include any of Examples 1-14, further comprising applying one or more annotations to the document indicating individual items therein.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method comprising:
   receiving an electronic communication with an omnibus document, the omnibus document containing more than one items, each item requiring docketing individually;
   identifying each of the more than one items which require docketing individually;
   applying one or more annotations at identified locations within the omnibus document indicating an end of one item and a start of another item;
   identifying the one or more annotations;
   splitting the omnibus document into individual items based on the identified locations within the omnibus document; and
   sending each of the more than one items to a docketing system for docketing.

2. The method of claim 1, further comprising determining one or more docket tasks associated with each item requiring docketing individually.

3. The method of claim 1, further comprising determining one or more deadlines associated with each item requiring docketing individually.

4. The method of claim 1, further comprising labeling each item.

5. The method of claim 1, further comprising sorting each item into one or more categories.

6. The method of claim 5, further comprising applying structured text to each item, the structured text denoting the one or more categories.

7. The method of claim 1, further comprising directing each item to one or more locations.

8. The method of claim 1, further comprising flagging at least one of the more than one items for further review.

9. The method of claim 1, further comprising identifying the omnibus document prior to identifying each of the more than one items to be docketed.

10. The method of claim 9, wherein identifying the omnibus document comprises performing optical character recognition.

11. The method of claim 9, wherein identifying the omnibus document comprises using an auxiliary annotation system.

12. The method of claim 1, wherein identifying each of the more than one items to be docketed comprises analyzing the omnibus document with optical character recognition.

13. The method of claim 12, wherein optical character recognition is used to identify one or more codes, phrases, templates, or other objects indicating different items in the omnibus document.

14. The method of claim 1, wherein identifying each of the more than one items to be docketed comprises analyzing the omnibus document using an auxiliary annotation system.

15. The method of claim 14, further comprising applying one or more annotations to the omnibus document indicating different items therein.

16. A system comprising:
   an intake tool configured to:
      receive one or more electronic communications and an associated omnibus document containing more than one items, each item requiring docketing individually, and
      apply one or more annotations at identified locations within the associated omnibus document indicating an end of one item and a start of another item, the intake tool having been trained by machine learning to identify indications that more than one item is included in the associated omnibus document;
   a splitting tool configured to identify the one or more annotations and split the associated omnibus document into individual items based on the identified locations within the associated omnibus document; and
   a docketing system, wherein the docketing system is at least partially automated, the docketing system configured to receive each of the more than one items from the splitting tool.

17. The system of claim 16, further comprising an electronic communication system for receiving the one or more electronic communications and directing the associated omnibus document to the intake tool.

18. The system of claim 16, further comprising a file database, wherein the intake tool is configured to scrape the one or more electronic communications from the file database.

19. The system of claim 16, further comprising file records, wherein the docketing system is configured to communicate with and update the file records.

20. The system of claim 16, wherein the docketing system is automated.

\* \* \* \* \*